Sept. 23, 1969             G. SMITH             3,468,556

AUTOMOBILE SAFETY DEVICES

Filed Aug. 4, 1967

INVENTOR
GORDON SMITH

BY

*Irwin C. Alter*

ATTORNEY

United States Patent Office 3,468,556
Patented Sept. 23, 1969

3,468,556
AUTOMOBILE SAFETY DEVICES
Gordon Smith, 2804 N. 44th St.,
Milwaukee, Wis. 53210
Filed Aug. 4, 1967, Ser. No. 658,462
Int. Cl. B60r 21/04
U.S. Cl. 280—150                                  1 Claim

ABSTRACT OF THE DISCLOSURE

Includes padded member mounted and disposed proximate to passenger to cushion passenger impact. Padded member is adjustable from operative position where it cushions passenger to inoperative position where passenger can have convenient ingress and egress.

My invention relates to automobile safety devices, and more particularly to a means for protecting the operator of the vehicle and its passengers during a collision of the vehicle.

The prime object of my invention is to provide a cushioning effect during impact of a vehicle.

Another object of my invention is to provide a device of the character described that may be applied to the vehicle as a permanent installation.

Still another object of my invention is to provide an arm rest for the operator and the passengers for their convenience and comfort.

Another object of my invention is to eliminate the use of seat belts, which in many cases are not buckled in position when they should be.

A further object of my invention is to have the device arranged in a manner to prevent any inconvenience for persons entering or leaving the vehicle.

A still further object of the invention is to enable the instrument panel and controls to be placed into an accessible position, and the steering wheel to be mounted in a recessed manner for access with either hand, as described in my co-pending application for patent.

It has become more and more apparent that in the majority of automobile accidents caused by collisions, or the like, that the driver of the vehicle, or the passengers, were injured due to contact with the steering wheel, or the dashboard of the vehicle, during the impact, and it is my intention to provide a means of overcoming this hazard.

The padded front dashboard makes it possible for the occupant of the automobile to contact the padded edge of the dashboard, thereby preventing the body of the occupant of the vehicle to be thrown forward during the impact.

The conventional front seat is usually arranged for slidable adjustment, forward and rearward, which permits the driver to enter and leave the vehicle equipped with the front padded device, covered by this application.

The padding illustrated for the rear seat of the vehicle may be hingedly or slidably mounted, or the rear seat may also be slidably mounted, for movement in a forward or rearward direction for the convenience of the rear seat passengers.

Then, too, the steering wheel may be recessed within the top surface of the front dashboard padding as illustrated herein, and claimed in my co-pending application, which enables the driver of the vehicle to use the padded dashboard as an arm rest for his comfort and convenience.

Other and further objects of my invention will become more apparent as the description proceeds, when taken in conjunction with the drawings, in which.

Figure 1:
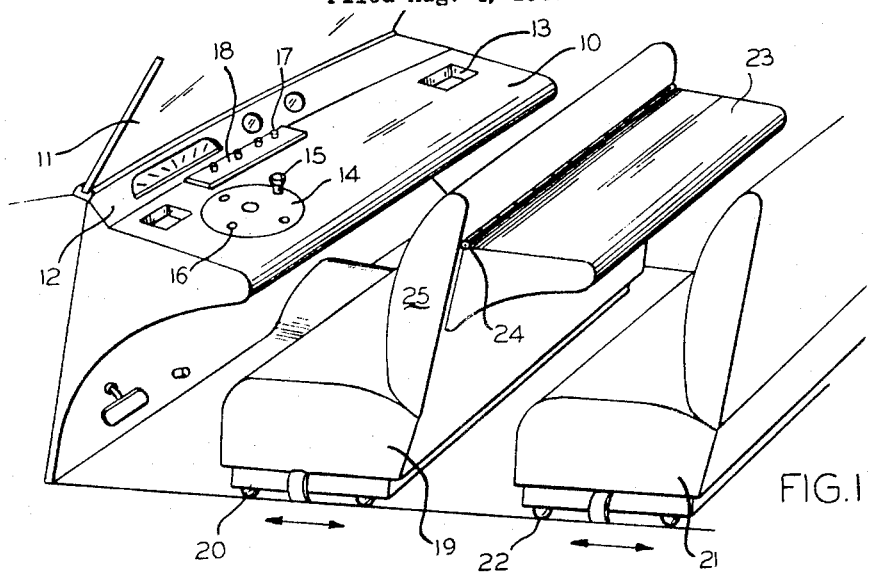
FIGURE 1 is a schematic perspective view of the interior of an automobile, illustrating the front and rear padded devices in their relation to the front and rear seats.
Figure 2:
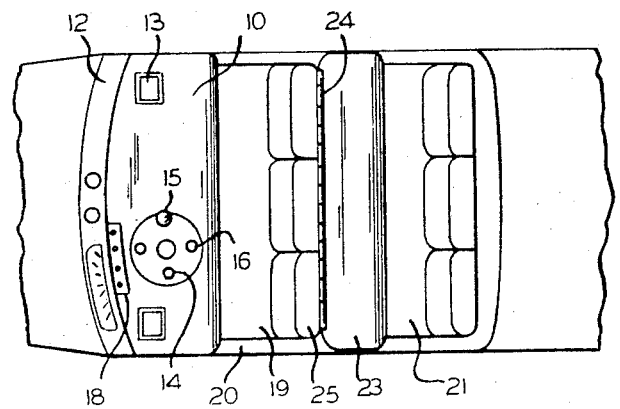
FIGURE 2 is a schematic top view of a conventional automobile with the padded devices in position.

Similar characters of reference indicate corresponding parts and features throughout the several views, and referring now to the same, the character 10 shows a flat padded dashboard, laterally extending across the entire front of the automobile as shown in FIGURE 1, showing the windshield 11 and an instrument panel 12 angularly disposed for convenient reasons.

The top surface of the dashboard 10 may have ash trays shown as 13 recessed therein at any convenient location, and the steering wheel shown as 14 is recessed into the padded dashboard and is shown equipped with a knob 15, which may be placed into any of the recesses shown as 16 for the convenience of the operator.

The purpose of the padded front dashboard is to support the driver and passenger, thus preventing them from being thrown forward when an impact occurs, caused by a collision or the like.

The flat surface of the dashboard 10 permits the operator of the vehicle to rest his arms onto the surface while manipulating the steering wheel 14, or the control buttons 17 extending from the plate 18, adjacent to the instrument panel 12.

The front seat shown as 19 may be mounted in the conventional manner as shown as 20, for forward and rearward movement to enable the driver and passenger to enter the vehicle with ease.

Figures 3, 4:
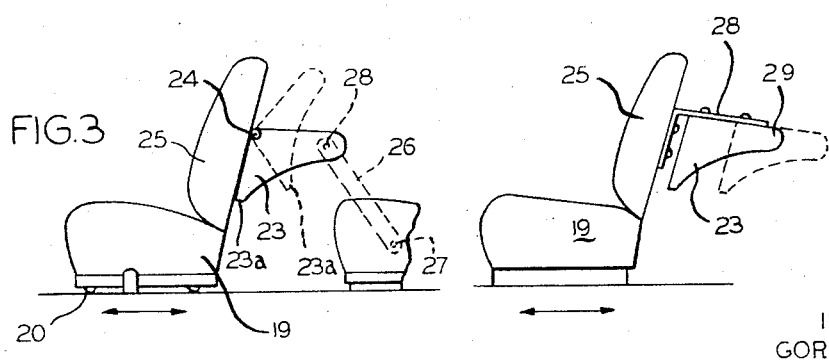
FIGURE 3 is a side view layout of the rear padded device hingedly attached to the back-rest of the front seat.
FIGURE 4 is a similar view showing the rear padded device slidably attached to the back-rest of the front seat.

The rear seat 21 may also be mounted for forward and rearward adjustment as shown at 22 in FIGURE 1 and a flat surface padded member 23 may be hingedly mounted at 24 to the back-rest 25 of the front seat 19, as shown in FIGURES 1 and 3, and if desired, a strap shown in phantom at 26, may be attached at its lower end 27 to the rear seat 21 and fastened in any convenient manner at 28 to the member 23. By referring to FIGURE 3, it will be noted that the padded member has a leg 23a that makes contact with the passenger when he is seated, whereby the padded member moves to its operative position (shown in solid). The padded member's 23 operative position cushions the passenger after seating; whereas the inoperative position which is shown in phantom enables egress and ingress to the automobile.

By referring to FIGURE 4, it will be noted that I show the padded member 23 slidably mounted to the back-rest 25 of the front seat 19 by means of a bracket 28, bringing the contact edge 29 closer to the occupant of the seat 21 for the occupant's safety during an impact.

From the above description and the illustrations shown, it will become manifest that the purpose of the padded members 10 and 23 is to protect the occupants of the vehicle from being forced forward during an impact, or fast braking of the vehicle.

Having thus described my invention, what I claim and desire to secure by Letters Patent in the United States is:

1. An automotive safety device for protecting the passengers of a vehicle during impact while the passenger is seated, said vehicle having a back and a front seat,
said device comprising a padded member mounted on the back of the front seat of said vehicle, said padded member having a substantially horizontally extending top, and being rotatably mounted, said padded member having an operative position where it cushions impact and an inoperative position for enabling a passenger to enter said automobile for seating, said padded member having a lower leg member that makes contact with said passengers legs in the inoperative position whereby said contact causes said padded member to be actuated to its operative position when said passenger is seated.

References Cited

UNITED STATES PATENTS

| 3,198,543 | 8/1965 | Presunka. | |
|---|---|---|---|
| 3,203,709 | 8/1965 | Presunka et al. | |
| 3,279,817 | 10/1966 | Henry | 280—150 |
| 3,393,010 | 7/1968 | Steinberg | 280—150 |

BENJAMIN HERSH, Primary Examiner

JOEL E. SIEGEL, Assistant Examiner